No. 652,385. Patented June 26, 1900.
C. J. COLEMAN.
SECONDARY BATTERY.
(Application filed Aug. 3, 1899.)
(No Model.)
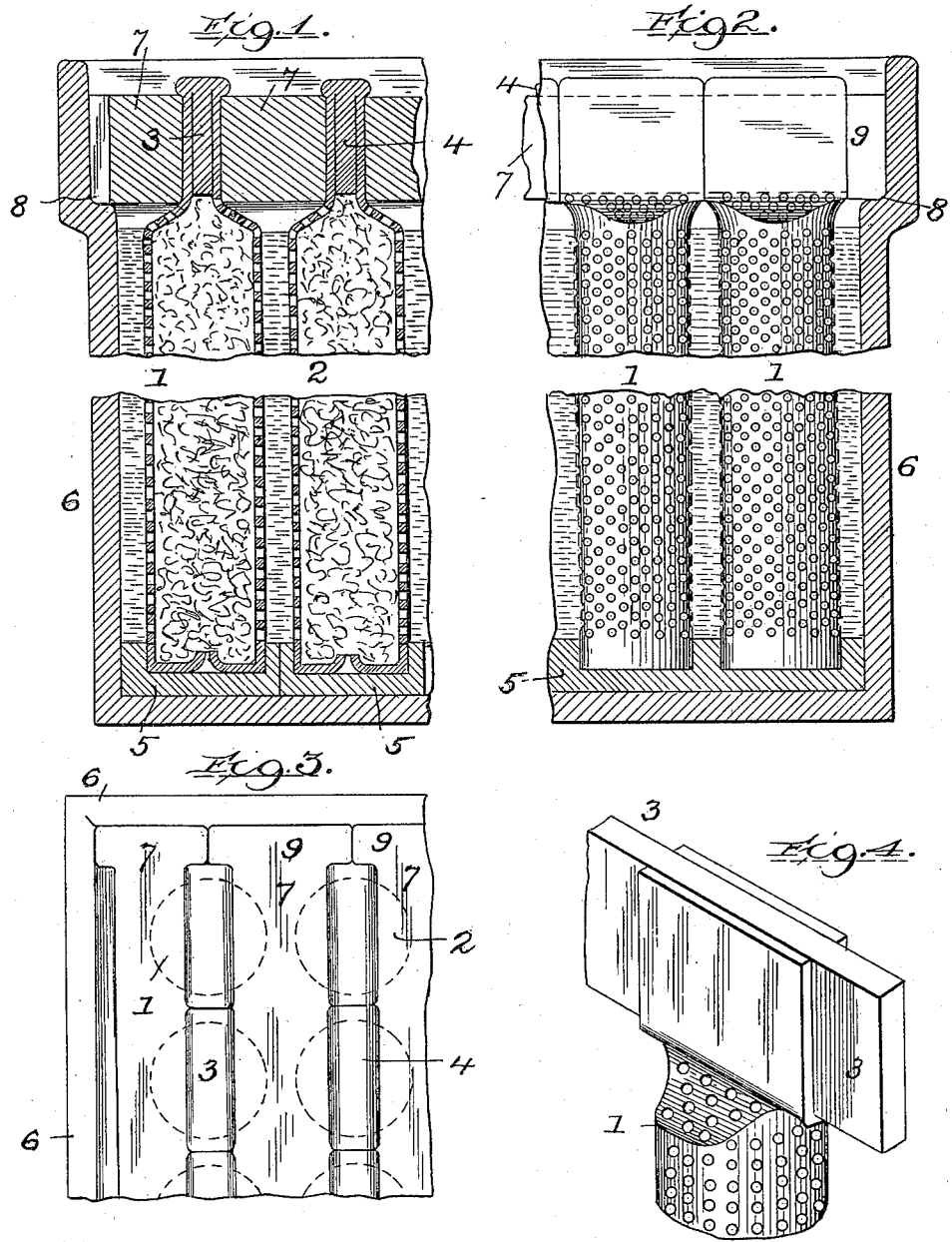

UNITED STATES PATENT OFFICE.

CLYDE J. COLEMAN, OF CHICAGO, ILLINOIS, ASSIGNOR TO THOMAS J. RYAN, OF NEW YORK, N. Y.

SECONDARY BATTERY.

SPECIFICATION forming part of Letters Patent No. 652,385, dated June 26, 1900.

Application filed August 3, 1899. Serial No. 726,014. (No model.)

*To all whom it may concern:*

Be it known that I, CLYDE J. COLEMAN, a citizen of the United States, residing at Chicago, in the county of Cook and State of Illinois, have invented certain new and useful Improvements in Secondary Batteries; and I do hereby declare the following to be a full, clear, and exact description of the same, reference being had to the accompanying drawings, forming a part of this specification.

This invention relates to that type of secondary batteries in which the active material is contained within a series of perforated tubes or casings to constitute the battery-electrodes.

The object of the present improvement is to provide a simple, durable, and efficient construction of the parts in which electrical connection of the parts is effected and maintained in a very perfect manner during continued use and which also affords lightness and durability in construction, so as to specially adapt the battery to portable uses, such as automobiles and the like. I attain such objects by the construction and arrangement of parts illustrated in the accompanying drawings, in which—

Figure 1 is a fragmentary transverse sectional elevation of a secondary battery embodying the present improvements; Fig. 2, a similar longitudinal sectional elevation; Fig. 3, a fragmentary top view of the same; Fig. 4, a detail perspective view illustrating the connection between one of the perforated cells and the connecting-strip of the present invention.

Similar numerals of reference indicate like parts in the several views.

As represented in the drawings, the positive and negative electrodes will be of a counterpart construction, and each will comprise a series of elongated tubular casing or cells 1 and 2, of perforated lead tubing, arranged in parallel and separated relation and connected together at their upper ends by means of the respective connecting-strips 3 and 4, inserted in vertical slits in the top portions of such perforated cells 1 and 2, after which the upper ends of such cells or casings are flattened upon said strips, so as to have intimate contact with the sides of the same. In my preferred construction, as illustrated in Fig. 1 of the drawings, the upper portions of the flattened upper ends of such perforated cells and of each connecting-strip will be fused together to attain perfect electrical conductive union between the series of cells and the respective connecting-strips or terminals of the electrodes. At bottom the series of tubular casings or cells are closed in any suitable manner, preferably by an inturning of the lower ends of the said cells, as illustrated in Fig. 1.

The series of positive and negative electrodes constituting the secondary battery are held in separated relation at bottom by means of spacing-strips 5, arranged in the bottom of the main containing vessel or casing 6 and provided with a series of spaced recesses that constitute individual sockets to receive the lower ends of the tubular cells 1 and 2, that constitute the respective electrodes of the battery. Separated relation of the electrodes at top is attained by means of distance-strips 7, that lie between the flattened upper ends of the electrodes, as illustrated in Figs. 1 and 3, the ends of such strips resting upon a ledge 8 of the main battery-casing 6 and formed with enlarged ends 9, the adjacent faces of which abut against each other to occupy the full width of the battery-casing to prevent bodily shifting of the electrodes, &c., in a transverse direction.

The series of tubular perforated casings or cells 1 and 2 are filled with loose active material, such as oxid of lead, to constitute the electrodes, as usual in the present type of secondary batteries, and in practice the perforations in the walls of such cells will be minute enough to prevent the escape of the loose active material.

Having thus fully described my said invention, what I claim as new, and desire to secure by Letters Patent, is—

1. In a secondary battery, the combination of a series of perforated conducting casings or cells for containing the active material, and a connecting-strip for said cells, the upper ends of the cells being formed with vertical slits to receive the connecting-strip, which upper ends are flattened upon the strip, substantially as set forth.

2. In a secondary battery, the combination of a series of perforated conducting casings or cells for containing the active material, and a connecting-strip for said cells, the upper ends of the cells being formed with vertical slits to receive the connecting-strip, which upper ends are flattened upon the strip, the upper edges of the strip and of the ends of the cells being fused together, substantially as set forth.

3. In a secondary battery, the combination of a series of elongated cylindrical perforated conducting-cells for containing the active material, and a connecting-strip for said cells, the upper ends of the cells being formed with vertical slits to receive the connecting-strip, which upper ends are flattened upon the strip, substantially as set forth.

4. In a secondary battery, the combination of a series of elongated cylindrical perforated conducting-cells for containing the active material, and a connecting-strip for said cells, the upper ends of the cells being formed with vertical slits to receive the connecting-strip which upper ends are flattened upon the strip, the upper edges of the strip and of the ends of the cells being fused together, substantially as set forth.

5. In a secondary battery, the combination of a series of perforated conducting casings or cells for containing the active material, and a connecting-strip for said cells, the upper ends of the cells being formed with vertical slits to receive the connecting-strip, which upper ends are flattened upon the strip, and bottom spacing-strips provided with a series of spaced recesses to receive the lower ends of the cells, substantially as set forth.

6. In a secondary battery, the combination of a series of perforated conducting casings or cells for containing the active material, and a connecting-strip for said cells, the upper ends of the cells being formed with vertical slits to receive the connecting-strip, which upper ends are flattened upon the strip, and top spacing-strips arranged between the flattened upper ends of the series of cells, substantially as set forth.

7. In a secondary battery, the combination of a series of perforated conducting casings or cells for containing the active material, and a connecting-strip for said cells, the upper ends of the cells being formed with vertical slits to receive the connecting-strip, which upper ends are flattened upon the strip, and top spacing-strips arranged between the flattened upper ends of the series of cells and provided with enlarged ends, substantially as set forth.

8. In a secondary battery, the combination of a series of perforated conducting casings or cells for containing the active material, and a connecting-strip for said cells, the upper ends of the cells being formed with vertical slits to receive the connecting-strip, which upper ends are flattened upon the strip, bottom spacing-strips provided with a series of spaced recesses to receive the lower ends of the cells, and top spacing-strips arranged between the flattened upper ends of the series of cells, substantially as set forth.

9. In an electrode for secondary batteries, the combination with a series of upright tubular perforated conductors filled with active material, of means under the series of tubular conductors separating, supporting and connecting them so as to prevent lateral movement thereof and a conducting-strip rigidly and electrically connecting the upper ends of said tubular conductors.

In testimony whereof witness my hand this 25th day of July, 1899.

CLYDE J. COLEMAN.

In presence of—
ROBERT BURNS,
M. H. HOLMES.